United States Patent Office 3,704,222
Patented Nov. 28, 1972

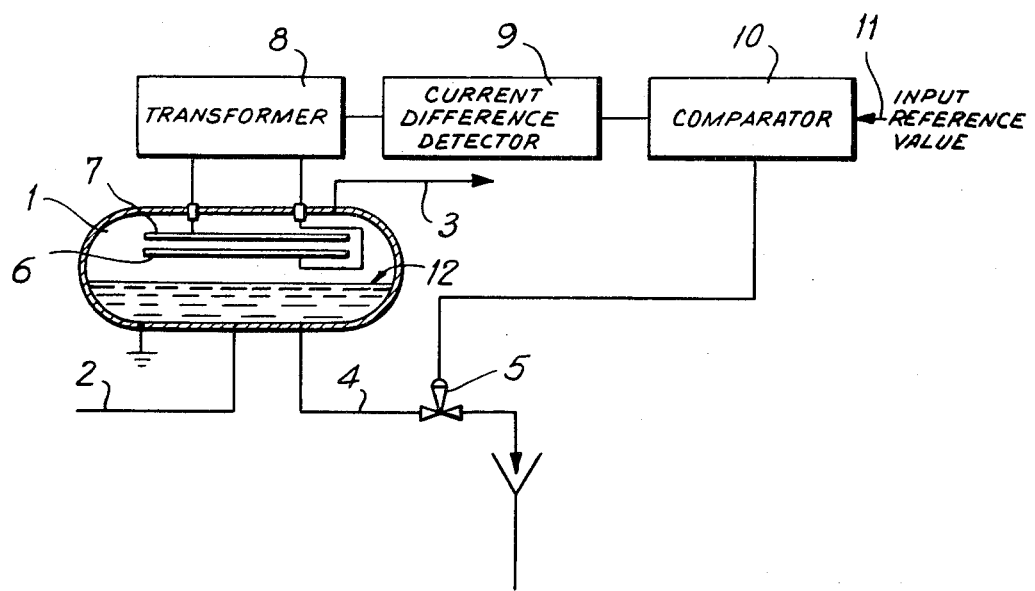

3,704,222
DEVICE FOR AUTOMATIC CONTROL OF THE PROCESS OF CRUDE PETROLEUM DESALTING AND DEHYDRATION IN ELECTRIC DEHYDRATORS
Boris Isaakovich Kusovsky, Nikolai Ivanovich Pavlov, Anatoly Petrovich Matiichenko, Sergi Alexandrovich Zakharov, and Dmitry Anatolievich Birjukov, Ryazan, U.S.S.R., assignors to Ryazansky Filial Spetsialnogo Konstruktorskogo Bjuro Ann, Ryazan, U.S.S.R.
Filed Jan. 22, 1970, Ser. No. 4,957
Int. Cl. B03c 5/02; C10g 33/02
U.S. Cl. 204—306
1 Claim

ABSTRACT OF THE DISCLOSURE

A device for automatic control of crude petroleum desalting and dehydration processes in electric dehydrators by varying the currents in electrode circuits as a result of discharging water and sludge via a regulating valve controlled by an actuating mechanism. A detector determines current difference in the top and bottom electrode circuits, the detector being connected to a comparator for comparing the currents in the electrode circuits with a reference input, the comparator being, in turn, coupled to an actuating mechanism of the regulating valve.

---

This invention relates to apparatus for crude petroleum pretreatment and, more particularly, to devices for automatic control of crude petroleum desalting and dehydration processes in electric dehydrators. The device, according to the invention, is applicable in the petroleum production and processing industries.

Known in the art is a device for automatic control of crude petroleum desalting and dehydration in electric dehydrators, in which use is made of a regulating valve controlled by an actuating mechanism and intended for water and sludge drainage from an electric precipitator tank.

In the known device, the actuating mechanism is connected to a comparator, the latter element serving to compare currents in the circuits of the electric dehydrator bottom and top electrodes with a pre-set current value.

If current variation is sensed in the circuit of the bottom electrode, water and sludge will be drained via the regulating valve from the electric dehydrator, thereby providing for current constancy in the electrode circuits.

However, the known device has a disadvantage in that variations in the quality of crude petroleum, as well as temperature fluctuations, or changes in the proportions of reactants and water used, etc. necessitate adjustment in the magnitude of the current in order to provide for the requisite conditions of saline water and sludge settling in the space between the bottom electrode and the saline water and sludge surface, the accurate adjustment of the current magnitude being particularly important when the crude petroleum to be treated is heavily watered and contains a large percentage of salts and sludge.

It is the principal object of the present invention to provide a device for automatic control of crude petroleum desalting and dehydration processes which will provide constancy of water and sludge settling conditions irrespective of changing physical and chemical properties of emulsions being treated.

This object is accomplished by the provision of a device for the automatic control of crude petroleum desalting and dehydration processes in an electric dehydrator by varying the magnitude of currents in the circuits of the top and bottom electrodes of an electric dehydrator as a result of water and sludge discharge via a regulating valve controlled by means of an actuating mechanism, to which is fed a signal from a comparator intended for comparing the currents in the electrode circuits with the pre-set current magnitude, wherein, according to the invention, use is made of a top and bottom electrode current difference detector coupled to the comparator, which compares the currents in the electrode circuits with the pre-set current magnitude, so that water and sludge discharge results in maintaining a constant difference of the currents in the circuits of the top and bottom electrode.

The invention is illustrated hereinbelow by the description of exemplary embodiments thereof to be taken in conjunction with the accompanying drawing, in which is shown an electric dehydrator and the block diagram of the device for automatic control of crude petroleum desalting and dehydration processes, according to the invention.

The electric dehydrator comprises a metal vessel 1 with a petroleum-oil emulsion inlet pipeline 2, treated petroleum outlet pipeline 3, and saline water and sludge discharge pipelines 4. Mounted in pipeline 4 is a regulating valve 5. Bottom electrode 6 and top electrode 7 are suspended inside vessel 1 and connected to a high-voltage transformer 8, whose primary winding is supplied from power mains.

Coupled to tranformer 8 is a top and bottom electrode current difference detector 9, which is connected, via comparator 10 for comparing a current difference with the pre-set value, to the actuating mechanism (not shown in the drawing) of regulating valve 5.

To the input 11 of comparator 10 is fed an input reference valve, which equals the difference of the currents in the circuits of electrodes 6 and 7, to be maintained.

The present device functions in the following manner. cumulate, the distance between bottom electrode 6 and level 12 of the water-petroleum interface diminishes, thereby causing the current in the circuit of electrode 6 to change with variations of the properties of the petroleum-water emulsion being treated, other process variables, e.g. the ratio of water and reactants fed to vessel 1 in the course of emulsion treatment, being also responsible for current fluctuations. The resulting current difference is detected by detector 9 and a signal, whose magnitude is proportional to said current difference, will be fed to comparator 10, which compares the actual current difference in the circuits of electrodes 6 and 7 with the reference input. Comparator 10 sends a signal to the actuating mechanism of regulating valve 5, so that the position of the operating member of regulating valve 5 will vary depending upon fluctuations of the increment of the current difference in the circuits of electrodes 6 and 7. Hence, continuous discharge of saline water and sludge through regulating valve 5 will provide for adjusting the current difference in the electrode circuits.

Electric dehydrators equipped with the device of the invention can be used to advantage at oil fields and refineries for pre-treating heavily watered crude petroleum containing a large percentage of salts and sludge.

The present device for the automatic control of crude oil desalting and dehydration processes provides steady and trouble-free performance of electric dehydrators.

The device of the invention is further advantageous in that it provides for optimum settling conditions and, hence, for enhancing the overall efficiency of crude petroleum desalting and dehydration processes.

We claim:

1. In an electric dehydrator having a vessel with a top and a bottom electrode disposed thereinside, and a device for automatic control of crude petroleum desalting and dehydration processes by varying the currents in the circuits of said electrodes as a result of discharging water and sludge from said vessel, an improvement comprising a regulating valve for the discharge of water and sludge; a detector for detecting the difference of currents in the circuits of said electrodes; a comparator for comparing the difference of currents in said electrode circuits with a reference input, the input of said comparator being coupled to the output of said current difference detector; said comparator being coupled to said regulating valve to control operation thereof so that water and sludge discharged via said regulating valve will provide a constant difference of the currents in said electrode circuits.

References Cited
FOREIGN PATENTS 1,556,271    1968    France _____ 204—306

JOHN H. MACK, Primary Examiner

N. A. KAPLAN, Assistant Examiner

U.S. Cl. X.R.

204—188